United States Patent [19]

Feeman

[11] Patent Number: 4,851,516
[45] Date of Patent: Jul. 25, 1989

[54] DYES FROM DIAZOTIZED SULFONYLAMINOALKYLPHOSPHONIC ACIDS AND NAPHTHOLDISULFONIC ACIDS

[75] Inventor: James F. Feeman, Wyomissing, Pa.

[73] Assignee: Crompton & Knowles Corporation, Stamford, Conn.

[21] Appl. No.: 123,392

[22] Filed: Nov. 20, 1987

[51] Int. Cl.$^4$ .................. C09B 62/533; C09B 62/83; D06P 1/38; D06P 3/66

[52] U.S. Cl. ........................... 534/641; 534/582; 534/583; 534/617

[58] Field of Search ..................... 534/617, 641

[56] References Cited

U.S. PATENT DOCUMENTS

| | | | |
|---|---|---|---|
| 4,150,020 | 4/1979 | Swidler et al. | 534/617 X |
| 4,150,021 | 4/1979 | Swidler et al. | 534/617 |
| 4,472,308 | 9/1984 | Gauthier | 534/617 |

FOREIGN PATENT DOCUMENTS

| | | | |
|---|---|---|---|
| 2353149 | 5/1974 | Fed. Rep. of Germany | 534/617 |
| 396256 | 1/1966 | Switzerland | 534/617 |
| 785457 | 10/1957 | United Kingdom | 534/617 |

Primary Examiner—Floyd D. Higel
Attorney, Agent, or Firm—Bernard Francis Crowe

[57] ABSTRACT

This invention relates to novel disazo dyes and processes for their production having the structure:

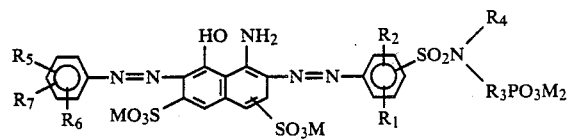

wherein:

$R_1$ is H, lower alkyl, chloro, lower alkoxy, —$CO_2M$;

$R_2$ is H, lower alkyl, lower alkoxy, chloro;

$R_3$ is lower alkylene;

$R_4$ is H or lower alkyl;

$R_5$ is H, lower alkyl, lower alkoxy, chloro, nitro, —NH-CO— lower alkyl; $CF_3$;

$R_6$ is H, lower alkyl, lower alkoxy, chloro, —$SO_3M$;

$R_7$ is —$SO_3M$, —$CO_2M$

M is H, Na, Li, K, $N_4$

8 Claims, No Drawings

DYES FROM DIAZOTIZED SULFONYLAMINOALKYLPHOSPHONIC ACIDS AND NAPHTHOLDISULFONIC ACIDS

This invention relates to novel disazo reactive dyes for cellulosic fibers which have the structure:

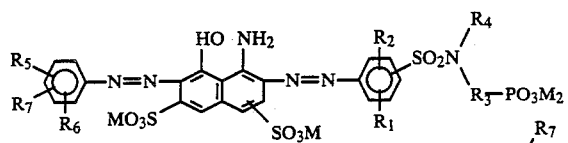

wherein:
- $R_1$ is H, lower alkyl, chloro, lower alkoxy, $-CO_2M$;
- $R_2$ is H, lower alkyl, lower alkoxy, chloro;
- $R_3$ is lower alkylene;
- $R_4$ is H or lower alkyl;
- $R_5$ is H, lower alkyl, lower alkoxy, chloro, nitro, $-NHCO$ lower alkyl, $CF_3$;
- $R_6$ is H, lower alkyl, lower alkoxy, chloro, $-SO_3M$;
- $R_7$ is $-SO_3M$, $-CO_2M$;
- M is H, Na, Li, K, $NH_4$ A preferred group of dyes is:

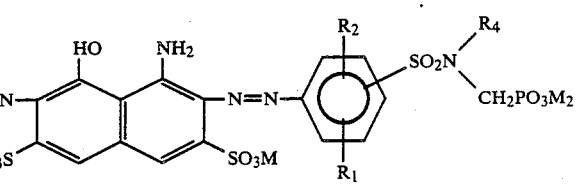

Especially preferred structures of this sub-class are:

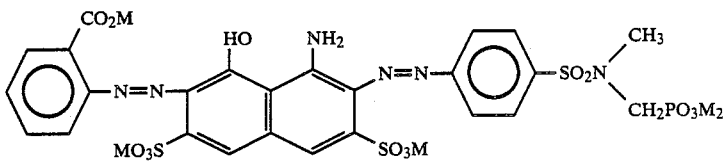

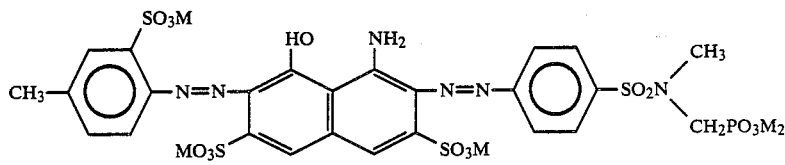

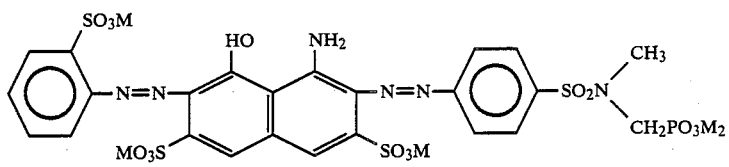

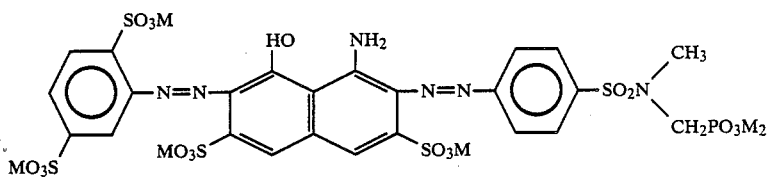

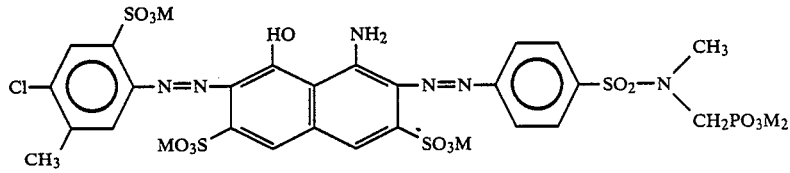

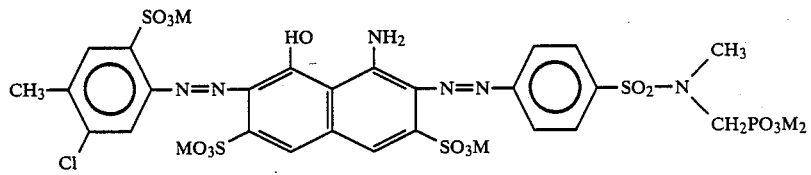

The dyes of this invention can be prepared by first coupling under strongly acid conditions, e.g. pH 0.5–2.0, the diazonium salt of an N-alkyl-N-(aminophenylsulfonyl)aminoalkylphosphonic acid having the structure:

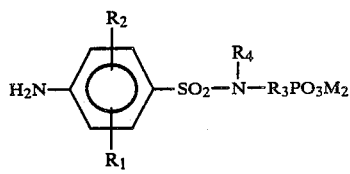

with 1-amino-8-naphthol-3(or 4),6-disulfonic acid, whereby substitution occurs selectively at the position ortho to the $NH_2$ group of the naphthalene nucleus, and then coupling ortho to the —OH group with a diazotized aniline mono or disulfonic acid or with a diazotized o-aminobenzenecarboxylic acid.

Suitable N-alkyl-N-(amino-phenylsulfonyl)aminoalkyl-phosphonic acids are disclosed and claimed in my simultaneously filed application entitled "N-Alkyl-N-(aminophenylsulfonyl)-aminoalkylphosphonic Acids". Especially preferred structures are:

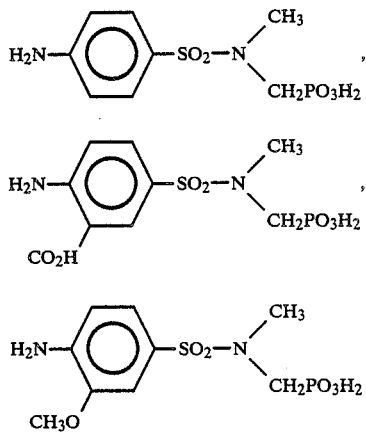

Suitable aniline mono- and di-sulfonic acids or o-aminobenzenecarboxylic acids include, e.g.
orthanilic acid
    4-methylaniline-2-sulfonic acid
    4-methyoxyaniline-2-sulfonic acid
    4-chloro-5-methylaniline-2-sulfonic acid
    5-chloro-4-methylaniline-2-sulfonic acid
    2,5-anilinedisulfonic acid
anthranilic acid
sulfanilic acid
metanilic acid
    2-amino-4-sulfobenzoic acid
    2-amino-5-sulfobenzoic acid
    4-chlorometanilic acid The new dyes can be used directly from reaction as aqueous solutions or can be isolated as solid products by conventional means such as spray drying or precipitation and filtration. They are preferably isolated in the acid form or in the form of the ammonium salt, or partly as an alkali metal salt, e.g. Li, Na, or K. These salts can be obtained by adding a halide, e.g. the chloride, of the desired alkali metal, or an ammonium halide to the reaction mixture before isolation.

The new dyes are soluble in water because of the presence of the phosphonic groups and of the sulfonic acid groups present. They can be used, in general, for coloring textiles, which are dyeable by anionic group containing dyes, such as natural and synthetic polyamides, but especially natural and regenerated cellulosics, such as cotton, linen and rayon.

For application to cellulosic textiles, they are applied to the fiber by conventional means such as padding and spraying as an aqueous solution at weakly acid pH, dried, and fixed by subjecting the fabric to temperatures of from 95° to 230° C. in the presence of a carbodiimide, e.g. dicyandiamide or cyanamide using the processes described in U.S. Pats. Nos. 4,134,722 and 4,139,345.

The new dyes are also suitable for application to mixed fabrics of cellulosics and synthetic fibers, and especially polyester materials, together with disperse dyes from a single dye bath or printing paste. These dyes have the advantage over other conventional dyes, of, e.g., the mono- and dichlorotriazinyl or vinyl sulfone types, which must be applied at alkaline pH values for fixation. This pH range causes flocculation of most disperse dyes. In the case of the phosphonic acid containing dyes, of which the new dyes are an example, the acidic condition used for fixation has no effect on the dispersions and the two classes of dyes work well together.

These days dye cellulosic fabrics in deep navy-blue hues, or, in admixture with small amounts of red and yellow dyes which also contain phosphonic acid groups, in black hues which have very good light and wet fastness properties together with low cost because of their high degree of fixation.

The invention is illustrated by the following examples, in which parts are by weight.

EXAMPLE 1

N-(4-Aminophenylsulfonyl)-N- methylaminomethylphosphonic acid (28 parts) in 28 parts of water and 17.5 parts of concentrated hydrochloric acid was cooled to 15° C. by addition of ice and diazotized by addition, during 1 hour as absorbed, of 7 parts of sodium nitrite dissolved in 20 parts of water. After removal of a slight excess of nitrous acid, 34.1 parts of 1-amino-8-naphthol-3,6-disulfonic acid, monosodium salt, was added as a solution at 90° C. in 650 parts of water during 15 minutes while keeping the coupling temperature at 15°–25° C. by further addition of ice. Red monoazo dye crystallized from the reaction mixture and was filtered after stirring for 45 minutes and salting out by addition of 65 parts of sodium chloride.

The filter cake (175 parts) was redissolved in 23 parts of concentrated ammonia solution.

Anthranilic acid (13.7 parts) was diazotized using 29 parts of hydrochloric acid (31.5%), 25 parts of water, ice to 5°–10° C., and a solution of 7 parts of sodium nitrite in 18 parts of water. The diazonium salt solution was added to the ammonium salt of the first coupling in a thin stream at 10°–15° C. while simultaneously adding 14 parts of concentrated ammonia solution to maintain the pH at 8.5–9.5. A dark navy-blue solution (532 parts) resulted which, after clarification from a trace of insoluble matter by filtration, was bottled.

When dyed on cotton by the process of U.S. Pat. No. 4,134,722, this dye gave deep navy-blue to black hues, having good light fastness at heavier depths of time, and excellent wash fastness.

In Example 1 while otherwise proceeding as described, when the anthranilic acid was replaced by equivalent amounts of the amines listed in Table I, dyes having listed hues were obtained which had similar properties to the dye of Example 1.

TABLE I

| Example No. | Amine | Hue on Cotton |
|---|---|---|
| 2 | Orthanilic Acid | bright reddish navy blue |
| 3 | 4-Aminotoluene-3-sulfonic acid | navy-blue |
| 4 | Sulfanilic Acid | navy-blue |
| 5 | 4-Amino-2-chlorotoluene-5-sulfonic acid | greenish navy-blue |
| 6 | 5-Amino-2-chlorotoluene-2-sulfonic acid | greenish navy-blue |

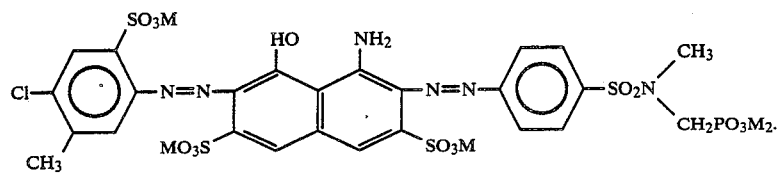
8. The disazo dye dyes as claimed in claim 1 of the formula:
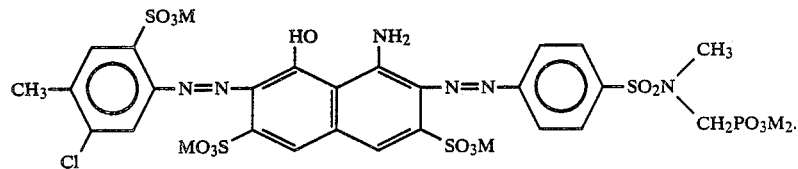

What is claimed is:

1. A disazo dye for cellulosic fibers having the structure:

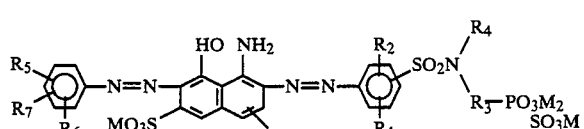

wherein:
$R_1$ is H, lower alkyl, chloro, lower alkoxy, $-CO_2M$;
$R_2$ is H, lower alkyl, lower alkoxy, chloro;
$R_3$ is lower alkylene;
$R_4$ is H or lower alkyl;
$R_5$ is H, lower alkyl, lower alkoxy, chloro, nitro, $-NH-CO-$lower alkyl, $CF_3$;
$R_6$ is H, lower alkyl, lower alkoxy, chloro, $-SO_3M$;
$R_7$ is $-SO_3M$, $-CO_2M$ and
$M$ is H, Na, Li, K, $NH_4$.

2. The disazo dye as claimed in claim 1 having the structure:

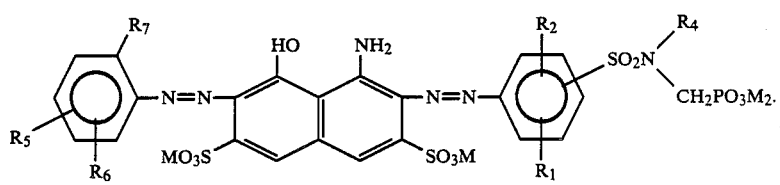

3. The disazo dye dyes as claimed in claim 1 of the formula:

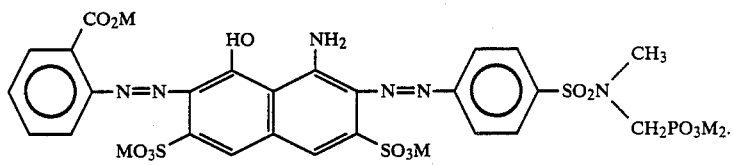

4. The disazo dye dyes as claimed in claim 1 of the formula:

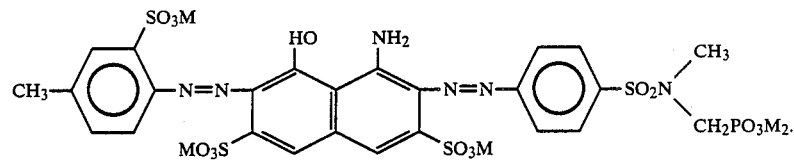

5. The disazo dye dyes as claimed in claim 1 of the formula:

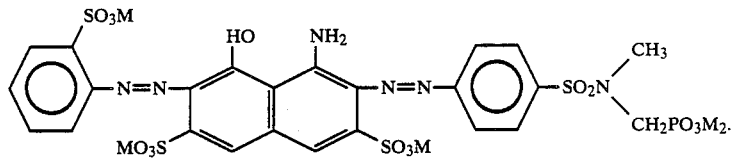

6. The disazo dye dyes as claimed in claim 1 of the formula:

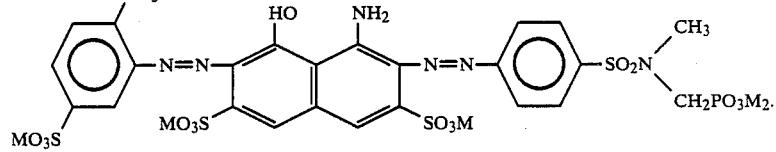

7. The disazo dye dyes as claimed in claim 1 of the formula: